(12) United States Patent
Goto

(10) Patent No.: US 11,313,306 B2
(45) Date of Patent: Apr. 26, 2022

(54) TORQUE MONITORING DEVICE

(71) Applicant: DENSO CORPORATION, Kariya (JP)

(72) Inventor: Takanobu Goto, Kariya (JP)

(73) Assignee: DENSO CORPORATION, Kariya (JP)

(*) Notice: Subject to any disclaimer, the term of this patent is extended or adjusted under 35 U.S.C. 154(b) by 46 days.

(21) Appl. No.: 16/775,651

(22) Filed: Jan. 29, 2020

(65) Prior Publication Data

US 2020/0165996 A1 May 28, 2020

Related U.S. Application Data

(63) Continuation of application No. PCT/JP2018/025697, filed on Jul. 6, 2018.

(30) Foreign Application Priority Data

Aug. 1, 2017 (JP) .............................. JP2017-149368

(51) Int. Cl.
*F02D 41/22* (2006.01)
*F02D 41/02* (2006.01)

(52) U.S. Cl.
CPC .......... *F02D 41/22* (2013.01); *F02D 41/0255* (2013.01); *F02D 2200/1004* (2013.01); (Continued)

(58) Field of Classification Search
CPC ................ F02D 41/22; F02D 41/0225; F02D 2200/501; F02D 2250/18; F02D 2250/22; F02D 2200/1004; Y02T 10/40
See application file for complete search history.

(56) References Cited

U.S. PATENT DOCUMENTS 5,625,558 A * 4/1997 Togai .................... F02D 11/105
701/93
6,125,322 A * 9/2000 Bischof ................ F02D 41/266
701/114

(Continued)

FOREIGN PATENT DOCUMENTS

JP 2001-152882 6/2001
JP 3855677 12/2006

(Continued)

OTHER PUBLICATIONS

U.S. Appl. No. 16/751,800 to Suzuki, titled "Internal Combustion Engine Control System", filed Jan. 24, 2020 (52 pages).

(Continued)

*Primary Examiner* — Lindsay M Low
*Assistant Examiner* — Susan E Scharpf
(74) *Attorney, Agent, or Firm* — Nixon & Vanderhye P.C.

(57) ABSTRACT

A torque monitoring device monitors the occurrence of an abnormal torque state causing an estimated torque as an estimated value for an actual torque of an internal combustion engine to differ from an engine-requested torque required of the internal combustion engine and includes: a discrete value setup unit configured to increase a discrete value correspondingly to increase in a difference quantity between the estimated torque and the engine-requested torque; an accumulation unit configured calculate an accumulation value of the discrete value; and a determination unit configured to determine that the abnormal torque state occurs when the accumulation value becomes larger than or equal to a predetermined abnormality determination threshold value.

12 Claims, 10 Drawing Sheets

(52) U.S. Cl.
CPC .... *F02D 2200/501* (2013.01); *F02D 2250/18* (2013.01); *F02D 2250/22* (2013.01); *Y02T 10/40* (2013.01)

(56) References Cited

U.S. PATENT DOCUMENTS

| | | | |
|---|---|---|---|
| 6,397,152 B1 * | 5/2002 | Kalweit | F02D 41/1497 |
| | | | 702/105 |
| 6,445,083 B2 * | 9/2002 | Gohring | B60R 25/04 |
| | | | 307/10.2 |
| 6,487,489 B2 * | 11/2002 | Schmitt | B60W 30/146 |
| | | | 701/93 |
| 2005/0000276 A1 * | 1/2005 | Bauer | F02D 11/107 |
| | | | 73/114.04 |
| 2015/0120168 A1 * | 4/2015 | Kono | B60W 50/045 |
| | | | 701/102 |
| 2016/0138494 A1 * | 5/2016 | Arikai | F02D 29/02 |
| | | | 701/102 |

FOREIGN PATENT DOCUMENTS

| | | |
|---|---|---|
| JP | 2014-80951 | 5/2014 |
| JP | 2015-10498 | 1/2015 |
| WO | 2019/021721 | 1/2019 |
| WO | 2019/021722 | 1/2019 |

OTHER PUBLICATIONS

U.S. Appl. No. 16/751,840 to Suzuki, titled "Internal Combustion Engine Control System", filed Jan. 24, 2020 (46 pages).

\* cited by examiner

TORQUE MONITORING DEVICE

CROSS REFERENCE TO RELATED APPLICATION

The present application is a continuation application of International Patent Application No. PCT/JP2018/025697 filed on Jul. 6, 2018, which designated the U.S. and claims the benefit of priority from Japanese Patent Application No. 2017-149368 filed on Aug. 1, 2017. The entire disclosures of all of the above applications are incorporated herein by reference.

TECHNICAL FIELD

The present disclosure relates to a torque monitoring device configured to monitor a torque abnormality of an internal combustion engine.

BACKGROUND

Conventionally, various sensing devices are employed in an internal combustion engine system to monitor physical quantities such as an output torque.

SUMMARY

According to an aspect of the present disclosure, a torque monitoring device is configured to monitor occurrence of an abnormal torque state in which an estimated torque, which is an estimated value for an actual torque of an internal combustion engine, differs from an engine-requested torque required of the internal combustion engine.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
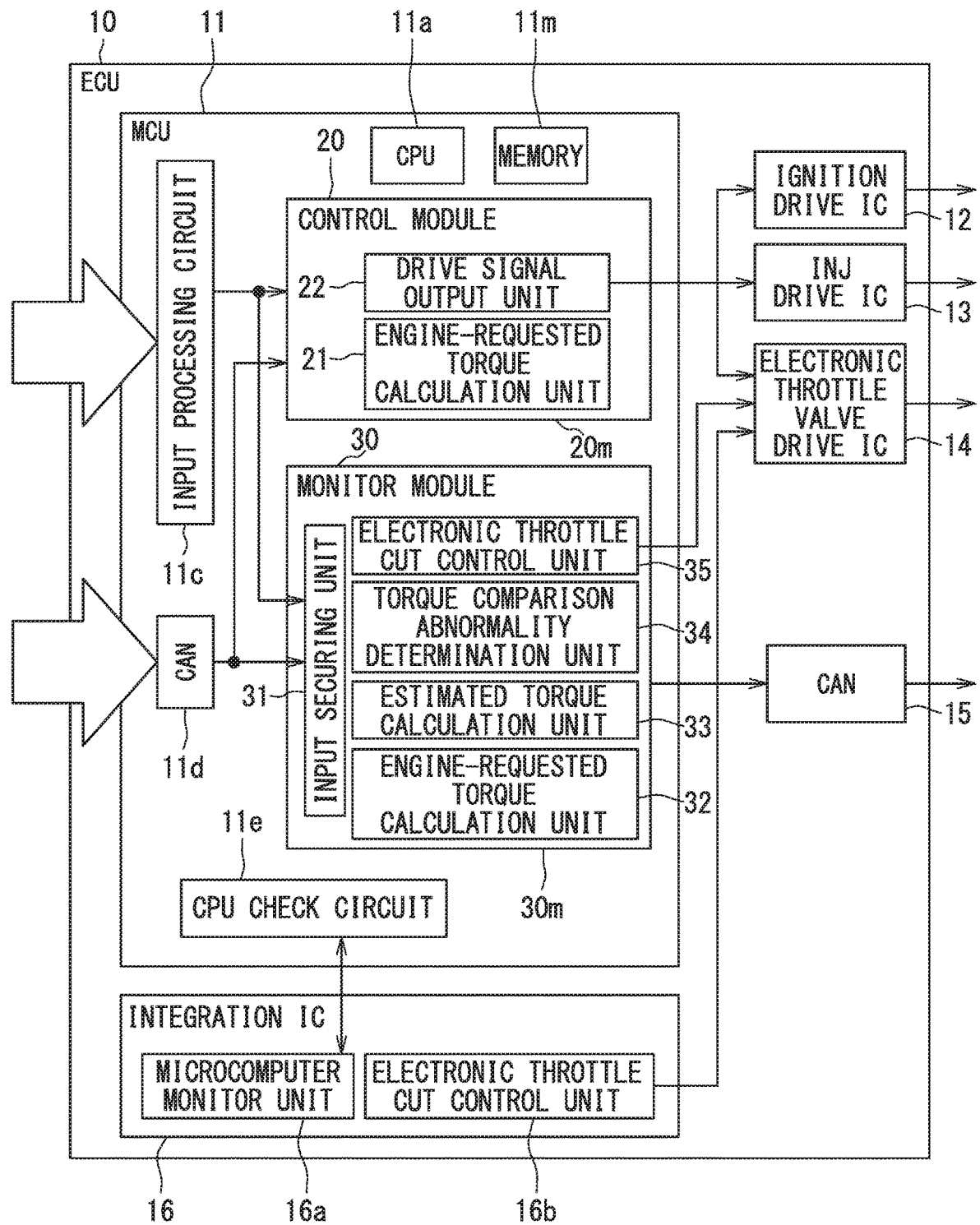
FIG. 1 is a block diagram illustrating an internal combustion engine control system according to a first embodiment.

To begin with, examples of the present disclosure will be described.

According an example of the present disclosure, an internal combustion engine is equipped with a torque monitoring device. The torque monitoring device monitors whether an actual torque of an internal combustion engine differs from an engine-requested torque required of the internal combustion engine and monitors whether the internal combustion engine is in an abnormal torque state.

The inventors conceived an exemplary configuration that determines a torque abnormality in a case where a state, in which the above-described difference between the actual torque and the engine-requested torque is larger than or equal to a predetermined amount, continues for a predetermined time (determination time) or longer.

In the conceivable configuration, it is further conceivable to shorten or extend the determination time. In the case where the determination time is shortened, if the difference temporarily increases due to a cause such as noise, a torque abnormality may be inappropriately determined. Alternatively, in the case where the determination time is extended, the torque abnormality may not be detected promptly.

According to an aspect of the present disclosure, a torque monitoring device is configured to monitor occurrence of an abnormal torque state in which an estimated torque, which is an estimated value for an actual torque of an internal combustion engine, differs from an engine-requested torque required of the internal combustion engine. The torque monitoring device comprises a discrete value setup unit configured to increase a discrete value correspondingly to increase in a difference quantity between the estimated torque and the engine-requested torque. The torque monitoring device further comprises an accumulation unit configured to implement accumulation of the discrete value to calculate an accumulation value. The torque monitoring device further comprises a determination unit configured to determine that the abnormal torque state occurs when the accumulation value becomes larger than or equal to a predetermined abnormality determination threshold value.

According to the one aspect, the torque monitoring device increases the discrete value correspondingly to increase in the difference quantity between the estimated torque and the engine-requested torque. The torque monitoring device further determines that the abnormal torque state occurs when the accumulated value of the discrete values exceeds the predetermined abnormality determination threshold value. The configuration facilitates the determination of the abnormal torque state according to the increase in the difference quantity, thereby to enable to accelerate the detection of the torque abnormality. In addition, the configuration hardly determines the abnormal torque state as the difference quantity decreases. The configuration enables to decrease a possibility of inappropriate determination of a torque abnormality due to a cause such as noise.

The description below explains a plurality of embodiments of the present disclosure with reference to the accompanying drawings. Functionally and/or structurally corresponding and/or associated parts in a plurality of embodiments may be designated by the same reference numerals or those differing in digits higher than or equal to the hundreds place. The description of the other embodiments can be referenced for the corresponding and/or associated parts.

First Embodiment

FIG. 1 illustrates an ECU (Electronic Control Unit) 10 mounted on a vehicle. The ECU 10 controls operations of an internal combustion engine mounted on a vehicle. The vehicle travels by using the internal combustion engine as a drive source. The present embodiment assumes an ignition gasoline engine to be the internal combustion engine. However, a self-igniting diesel engine may also be applicable. The vehicle includes a transmission device that converts a revolution speed from an output shaft of the internal combustion engine into an intended revolution speed and outputs the revolution speed.

The ECU 10 includes an MCU 11 (Micro Controller Unit), an ignition drive IC 12, a fuel injection valve drive IC 13, an electronic throttle valve drive IC 14, a communication circuit 15, and an integration IC 16.

The MCU 11 includes a CPU 11a as an arithmetic processing unit, a memory 11m as a storage medium, an input processing circuit 11c, a communication circuit 11d, and a CPU check circuit 11e. According to the example in FIG. 1, the MCU 11 uses one semiconductor chip to integrate the CPU 11a, the memory 11m, the input processing circuit 11c, the communication circuit 11d, and the CPU check circuit 11e. However, these components may be distributed to a plurality of semiconductor chips for integration. When the components are distributed to the semiconductor chips for integration, the semiconductor chips may be mounted on a common substrate or may be mounted on a plurality of substrates respectively. The semiconductor chips may be accommodated in a common container or may be accommodated in separate containers.

The memory 11m represents a storage medium to store program and data and includes a non-transitory tangible storage medium to temporarily store a program the CPU 11a can read. The storage medium can be provided as a semiconductor memory or a magnetic disk. The CPU 11a executes a program stored in the memory 11m and thereby allows the ECU 10 to function as the device described in this specification and allows the control device to function to perform the method described in this specification.

Means and/or functions provided by the control device are available as the software recorded on a substantial recording medium and a computer to execute the software, only the software or the hardware or a combination of these. When the control device is supplied as an electronic circuit or the hardware, for example, the control device is available as a digital circuit or an analog circuit including many logic circuits.

The MCU 11 is supplied with various signals such as engine speed, an accelerator position, an intake manifold pressure, an exhaust pressure, water temperature, oil temperature, and an external signal output from an external ECU. These signals are input to the input processing circuit 11c or the communication circuit 11d from the outside of the ECU 10.

A signal corresponding to the engine speed represents a detection value from a crank angle sensor. Based on this detection value, the MCU 11 calculates the number of revolutions of a crankshaft (output shaft) of the internal combustion engine per unit time, namely, the revolution speed of the output shaft. A signal corresponding to the accelerator position represents a detection value from an accelerator pedal sensor. Based on this detection value, the MCU 11 calculates the amount of accelerator pedal depression operated by a vehicle driver or a user of the internal combustion engine.

A signal corresponding to the intake manifold pressure represents a detection value from an intake air pressure sensor. Based on this detection value, the MCU 11 calculates the pressure of intake air introduced into a combustion chamber. A signal corresponding to the exhaust pressure represents a detection value from an exhaust pressure sensor. Based on this detection value, the MCU 11 calculates the pressure of exhaust gas from a combustion chamber. A signal corresponding to the water temperature represents a detection value from a water temperature sensor 5. Based on this detection value, the MCU 11 calculates the temperature of water to cool the internal combustion engine. A signal corresponding to the oil temperature represents a detection value from an oil temperature sensor. Based on this detection value, the MCU 11 calculates the temperature of lubricating oil of the internal combustion engine or working fluid of a hydraulic actuator.

Examples of external signals output from the external ECU include a signal representing operation states of an auxiliary machine that uses the output shaft of the internal combustion engine as a drive source. Examples of the auxiliary machine include a refrigerant compressor included in an air conditioner that provides air conditioning inside a vehicle compartment. The compressor uses the output shaft of the internal combustion engine as a drive source.

The ignition drive IC 12 includes a switching element that controls activation and inactivation of power supply to an ignition device included in the internal combustion engine. The MCU 11 outputs a directive signal to the switching element. Based on the above-described various signals such as the engine speed, the MCU 11 calculates a target ignition timing, namely, a target value of the time when the ignition device activates discharge ignition. The MCU 11 outputs a directive signal corresponding to the calculated target ignition timing to the ignition drive IC 12.

The fuel injection valve drive IC 13 includes a switching element that controls activation and inactivation of power supply to a fuel injection valve included in the internal combustion engine. The MCU 11 outputs a directive signal to the switching element. Specifically, the MCU 11 calculates a target injection amount based on the above-described various signals such as engine speed. The target injection amount represents a target value of the period (injection amount) during which the fuel injection valve injects the fuel. The MCU 11 outputs a directive signal corresponding to the calculated target injection amount to the fuel injection valve drive IC 13.

The electronic throttle valve drive IC 14 includes a switching element that controls activation and inactivation of power supply to an electronic throttle valve included in the internal combustion engine. The MCU 11 outputs a directive signal to the switching element. Specifically, the MCU 11 calculates a target opening degree based on the above-described various signals such as engine speed. The target opening degree represents a target value of the valve opening degree for the electronic throttle valve. The MCU 11 outputs a directive signal corresponding to the calculated target opening degree to the electronic throttle valve drive IC 14.

The ECU 10 controls operations of the ignition device, the fuel injection valve, and the electronic throttle valve to control combustion states of the internal combustion engine. The target ignition timing, the target injection amount, and the target opening degree calculated by the MCU 11 are comparable to a target control amount as a target value of the control amount to control combustion states of the internal combustion engine.

The communication circuit 15 outputs various types of information managed by the MCU 11 to an external ECU. For example, the communication circuit 15 outputs a signal for an abnormality flag to a display ECU. The abnormality flag notifies an occurrence of abnormality such as an abnormal torque state. The display ECU controls operations of a display device the vehicle driver visually recognizes. The display ECU generates an alarm indication or alarm sound when acquiring the signal for the abnormality flag.

The integration IC 16 mainly includes, though unillustrated, a memory and a CPU to execute various types of programs stored in the memory. Depending on a program executed by the CPU, the integration IC 16 functions as a microcomputer monitor unit 16a or an electronic throttle cut control unit 16b.

The CPU check circuit 11e checks whether the CPU 11a and the memory 11m are normal by performing a check (such as a parity check) to determine whether programs and data stored in the memory 11m are normal. The microcomputer monitor unit 16a monitors malfunctioning of the MCU 11 by referencing check results from the CPU check circuit 11e.

The integration IC 16 performs control of electronic throttle cut that limits operations of the electronic throttle valve when the microcomputer monitor unit 16a detects an abnormality. For example, the integration IC 16 binds the target opening degree to a predetermined opening degree regardless of the accelerator opening degrees and limits output from the internal combustion engine to be less than a predetermined output. Alternatively, the integration IC 16 zeroes the target opening degree and forcibly stops the internal combustion engine. The electronic throttle cut control unit 16b outputs a signal directing the electronic throttle cut to the electronic throttle valve drive IC 14. The electronic throttle valve drive IC 14 operates on an electronic throttle cut directive signal in priority to directive signals output from the MCU 11.

The MCU 11 includes a control module 20 and a monitor module 30. These modules are functions provided from the CPU 11a and the memory 11m that are used in common. The CPU 11a and the memory 11m function as the control module 20 when the CPU 11a executes a control program stored in a control storage area 20m of the memory 11m.

The CPU 11a and the memory 11m function as the monitor module 30 when the CPU 11a executes a monitor program stored in a monitor storage area 30m of the memory 11m. The control storage area 20m and the monitor storage area 30m are separately allocated to different locations in the storage area of the memory 11m.

The control module 20 provides a "control arithmetic device" that arithmetically computes the above-described various target control amounts based on a user-requested torque as a torque requested by a user to drive the internal combustion engine. The monitor module 30 provides a "monitor arithmetic device" that monitors whether there occurs an abnormal torque state that causes an estimated torque as an estimated value for an actual torque of the internal combustion engine to differ from an engine-requested torque required of the internal combustion engine by an amount greater than or equal to a predetermined criterion. The ECU 10 provides a "torque monitoring device" including the control arithmetic device and the monitor arithmetic device.

The control module 20 includes functions as an engine-requested torque calculation unit 21 and a drive signal output unit 22. The engine-requested torque calculation unit 21 calculates the engine-requested torque based on various signals acquired from the input processing circuit 11c and the communication circuit 11d. The engine-requested torque is requested of the internal combustion engine. Based on the engine-requested torque calculated by the engine-requested torque calculation unit 21, the drive signal output unit 22 performs an arithmetic computation on the above-described target control amounts such as the target ignition timing, the target injection amount, and the target opening degree. Based on the arithmetically computed target control amounts, the drive signal output unit 22 outputs various directive signals to the actuators such as the ignition drive IC 12, the fuel injection valve drive IC 13, and the electronic throttle valve drive IC 14.

Figure 2:
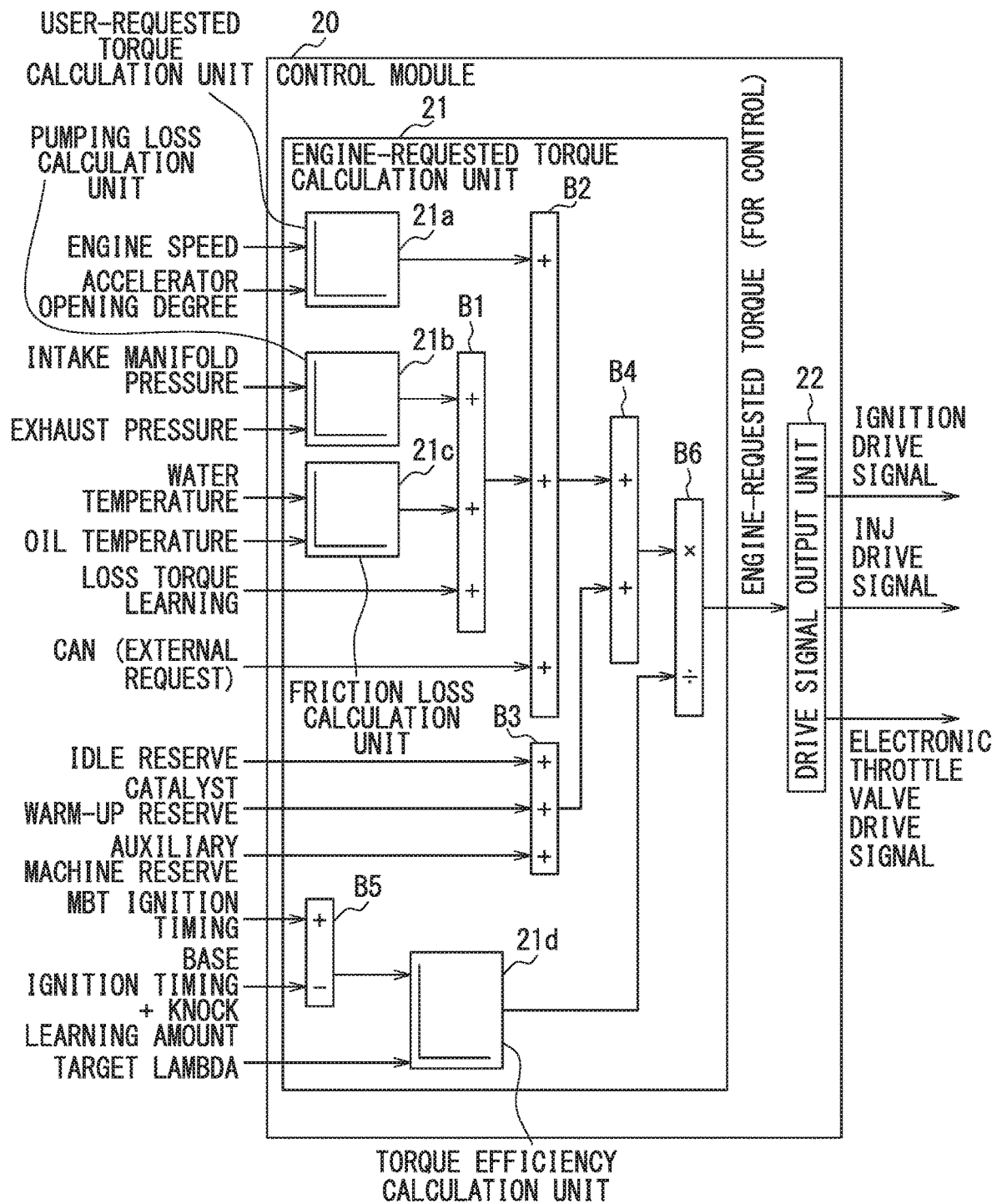
FIG. 2 is a block diagram illustrating the control module illustrated in FIG. 1.

The detailed description follows by use of FIG. 2. The engine-requested torque calculation unit 21 includes functions as a user-requested torque calculation unit 21a, a pumping loss calculation unit 21b, a friction loss calculation unit 21c, a torque efficiency calculation unit 21d, and operation units B1 to B6.

The user-requested torque calculation unit 21a calculates user-requested torque based on the engine speed and the accelerator opening degree described above. The user-requested torque is calculated to be an increasingly large value as the engine speed or the accelerator opening degree increases. For example, the memory 11m previously stores a map representing correlations among the engine speed, the accelerator opening degree, and the user-requested torque. By referencing the map, the user-requested torque calculation unit 21a calculates the user-requested torque corresponding to the engine speed and the accelerator opening degree.

The pumping loss calculation unit 21b calculates pumping loss torque based on the intake manifold pressure and the exhaust pressure described above. The pumping loss torque represents a value resulting from converting a pumping loss into the torque. The pumping loss signifies an energy loss due to the resistance caused by the intake and exhaust when a piston of the internal combustion engine reciprocates. A decrease in the intake manifold pressure increases a pumping loss value on the assumption that an intake stroke of the piston causes large intake resistance. Increase in the exhaust pressure increases a pumping loss value on the assumption that an exhaust stroke of the piston causes large exhaust resistance. For example, the memory 11m previously stores a map representing correlations among the intake manifold pressure, the exhaust pressure, and the pumping loss. By referencing the map, the pumping loss calculation unit 21b calculates a pumping loss corresponding to the intake manifold pressure and the exhaust pressure.

The friction loss calculation unit 21c calculates friction loss torque based on the water temperature and the oil temperature described above. The friction loss torque represents a value resulting from converting a friction loss into the torque. The friction loss signifies a mechanical energy loss due to the friction between a cylinder and the reciprocating piston in the internal combustion engine. The friction is assumed to be large when the water temperature decreases or increases to be outside an appropriate range. The friction loss is set to a large value. The viscosity of lubricating oil, for example, is assumed to be large when the oil temperature is low. The friction loss is set to a large value. For example, the memory 11m previously stores a map representing correlations among the water temperature, the oil temperature, and the friction loss. By referencing the map, the friction loss calculation unit 21c calculates a friction loss corresponding to the water temperature and the oil temperature.

The operation unit B1 arithmetically computes a total loss torque by adding the pumping loss calculated by the pumping loss calculation unit 21b, the friction loss calculated by the friction loss calculation unit 21c, and a loss torque learning value. The operation unit B2 arithmetically computes a loss-inclusive torque by adding the user-requested torque calculated by the user-requested torque calculation unit 21a, the total loss torque calculated by the operation unit B1, and the externally requested torque. Examples of the externally requested torque include the torque correspondingly to increase in the power generation when a generator driven by the internal combustion engine increases the amount of power generation to charge an onboard battery.

The operation unit B3 arithmetically computes a reserve torque by adding torques corresponding to an idle reserve, a catalyst warm-up reserve, and an auxiliary machine reserve. The control module 20 sets each of the reserve torques corresponding to operation states of the internal combustion engine such as the engine speed, the engine load, and the water temperature. The operation unit B4 arithmetically computes a reserve-inclusive torque by adding the reserve torque arithmetically computed by the operation unit B3 to the loss-inclusive torque arithmetically computed by the operation unit B2.

The idle reserve torque corresponds to increase in the torque when the control is performed to increase the torque during idling operation of the internal combustion engine and to stabilize the combustion. The catalyst warm-up reserve torque corresponds to a value resulting from converting a combustion energy loss into the torque. The combustion energy is used to perform warm-up control to increase the exhaust temperature. The warm-up control increases the exhaust temperature to increase the temperature of a catalyst purifying the exhaust gas from the internal combustion engine to be higher than or equal to the activation temperature. The auxiliary machine reserve torque is needed to drive the auxiliary machine such as a generator using the internal combustion engine as a drive source.

The torque efficiency calculation unit 21d calculates a torque efficiency based on an ignition timing to generate the maximum torque (MBT ignition timing), a base retard angle amount including knock learning, and a target lambda. The MBT ignition timing signifies an ignition timing to acquire the maximum torque and differs mainly depending on the engine speed, the engine load, and the water temperature. However, knocking easily occurs at the MBT ignition timing. The ignition needs to occur at a timing later than the MBT ignition timing for a predetermined time, namely, at a timing retarded at a predetermined angle. The timing retarded at a predetermined angle is denoted as a base ignition timing. The retard angle amount (base retard angle amount) differs mainly depending on the engine speed, the engine load, and the water temperature.

When a sensor detects knocking, feedback control is performed to correct and retard the ignition timing for a predetermined time. Learning control denoted as knock learning reflects the retard angle correction amount (knock learning amount) on the subsequent ignition timing control. The target ignition timing reflects the knock learning amount on the base ignition timing.

The operation unit B5 subtracts the target ignition timing from the MBT ignition timing to arithmetically compute an MBT retard angle amount, namely, the retard angle amount as a difference between the MBT ignition timing and the target ignition timing. The torque efficiency calculation unit 21d calculates the torque efficiency based on the MBT retard angle amount and the target lambda arithmetically computed by the operation unit B5.

The torque efficiency denotes a ratio between the combustion energy in the combustion chamber and the energy converted into the rotating torque of the crankshaft. The torque efficiency is calculated to be an increasingly large value as the MBT retard angle amount decreases, namely, the target ignition timing approximates to the MBT ignition timing. The target lambda denotes a target value for a ratio (lambda) between the air and the fuel contained in an air-fuel mixture combusted in the combustion chamber. The torque efficiency calculation unit 21d calculates the torque efficiency as a value corresponding to the target lambda. For example, the memory 11m previously stores a map representing correlations among the MBT retard angle amount, the target lambda, and the torque efficiency. By referencing the map, the torque efficiency calculation unit 21d calculates the torque efficiency corresponding to the MBT retard angle amount and the target lambda.

The control module 20 sets each of the MBT ignition timing, the base ignition timing, and the target lambda described above corresponding to operation states of the internal combustion engine such as the engine speed, the engine load, and the water temperature.

The control module 20 performs the learning control related to the above-described knock learning. The ECU 10 according to the present embodiment includes a detection circuit that detects a drive current or voltage output from the ignition drive IC. The control module 20 performs an arithmetic computation on the engine-requested torque by using a detection value from the detection circuit. Specifically, the control module 20 calculates an actual ignition timing based on the detection value, performs the learning control related to the knock learning by using the actual ignition timing, and calculates the knock learning amount.

The operation unit B6 divides the reserve-inclusive torque arithmetically computed by the operation unit B4 by the torque efficiency calculated by the torque efficiency calculation unit 21d to arithmetically compute a control engine-requested torque used for the engine control. Namely, the engine-requested torque calculation unit 21 adds the total loss torque and the reserve torque to the user-requested torque and divides the added value by the torque efficiency to calculate the engine-requested torque.

As above, the monitor module 30 monitors whether an estimated torque enters the abnormal torque state to differ from the engine-requested torque by an amount greater than or equal to a predetermined criterion. The estimated torque provides a value estimated for the actual torque of the internal combustion engine. The engine-requested torque denotes the torque requested of the internal combustion engine and equals the engine-requested torque calculated by the engine-requested torque calculation unit 21 of the control module 20. However, the engine-requested torque calculated by the monitor module 30 is used to monitor a torque abnormality. The engine-requested torque calculated by the control module 20 is used to calculate the target control amount for the internal combustion engine. The monitor engine-requested torque and the control engine-requested torque are arithmetically computed at different locations in the storage area of the memory 11m.

As illustrated in FIG. 1, the monitor module 30 includes functions as an input securing portion 31, an engine-requested torque operation unit 32, an estimated torque operation unit 33, a torque comparison abnormality determination unit 34, and an electronic throttle cut control unit 35.

The input securing portion 31 performs a check (such as a parity check) to determine whether data for various signals acquired from the input processing circuit 11c and the communication circuit 11d is normal. If the data is abnormal, the input securing portion 31 repairs, re-acquires, or discards the data. This enables to allow the monitor module 30 to avoid various calculations by using the abnormal data. The input securing portion 31 secures the normality of various data used for the calculation on the monitor module 30.

The torque comparison abnormality determination unit 34 calculates a difference between a period-requested torque calculated by the engine-requested torque operation unit 32 and an estimated torque calculated by the estimated torque operation unit 33 and determines the above-described abnormal torque state when the difference is larger than or equal to a predetermined criterion. The abnormality determination will be described in detail by the use of FIGS. 5 and 12. When the abnormal torque state is determined, the electronic throttle cut control unit 35, similarly to the electronic throttle cut control unit 16b, outputs a signal directing the electronic throttle cut to the electronic throttle valve drive IC 14.

Figure 3:
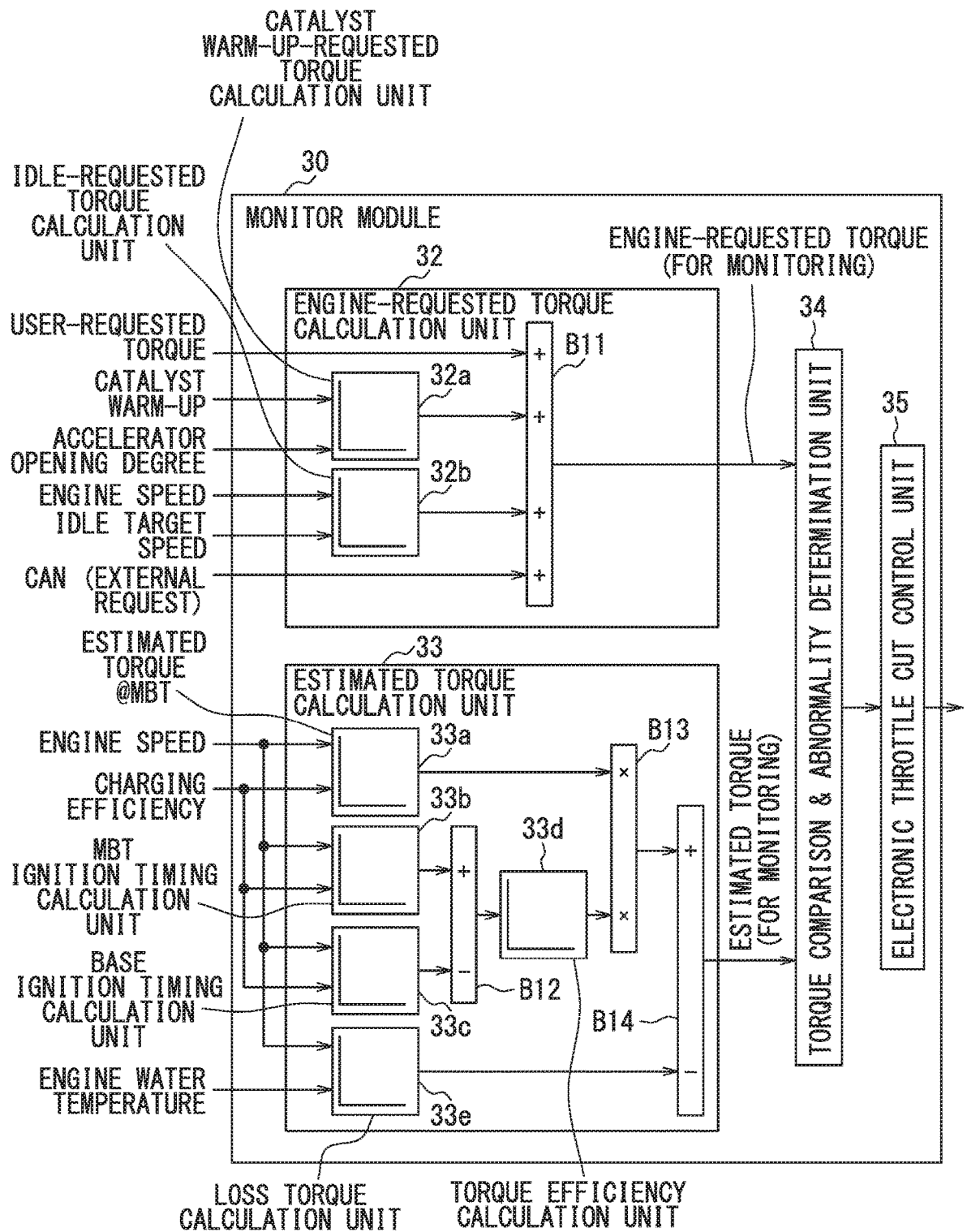
FIG. 3 is a block diagram illustrating the monitor module illustrated in FIG. 1.

As illustrated in FIG. 3, the engine-requested torque operation unit 32 includes functions as a catalyst warm-up-requested torque calculation unit 32a, an idle-requested torque calculation unit 32b, and an operation unit B11.

The catalyst warm-up-requested torque calculation unit 32a calculates a catalyst warm-up-requested torque based on a catalyst warm-up target speed and the above-described accelerator opening degree. As above, the warm-up control increases the exhaust temperature to heat a catalyst purifying the exhaust gas from the internal combustion engine up to the activation temperature or higher. The catalyst warm-up target speed provides a target value for the engine speed during a period while the warm-up control is performed. The catalyst warm-up-requested torque calculation unit 32a calculates a catalyst warm-up-requested torque based on the accelerator opening degree and the catalyst warm-up target speed during the period while the warm-up control is performed.

The catalyst warm-up-requested torque is synonymous with a catalyst warm-up reserve torque. The catalyst warm-up-requested torque calculated from the monitor module 30 is used to monitor a torque abnormality. The catalyst warm-up reserve torque calculated from the control module 20 is used to calculate a target control amount concerning the internal combustion engine. The catalyst warm-up-requested torque for monitoring and the catalyst warm-up reserve torque for control are arithmetically computed in different sections of the storage area for the memory 11m.

FIG. 3 illustrates the catalyst warm-up target speed and the accelerator opening degree as example variables used to calculate the catalyst warm-up-requested torque. The other variables include the water temperature, the user-requested torque, the engine speed, and the intake air charging efficiency. The intake air charging efficiency signifies a ratio of the flow volume of the intake air compressed in the combustion chamber to the flow volume of the intake air passing through the throttle valve. The catalyst warm-up-requested torque calculation unit 32a uses at least one of these variables to calculate the catalyst warm-up-requested torque.

When an accelerator pedal is not depressed, for example, increase in the catalyst warm-up target speed increases a calculation result of the catalyst warm-up-requested torque (reserve amount). When the accelerator pedal is depressed and the accelerator opening degree is smaller than a predetermined value, the catalyst warm-up-requested torque is set to the predetermined value. When the accelerator opening degree is larger than or equal to the predetermined value, the catalyst warm-up-requested torque is set to zero. The catalyst warm-up-requested torque may be increased or decreased depending on the water temperature, the engine speed, or the charging efficiency.

The idle-requested torque calculation unit 32b calculates an idle-requested torque based on idle target speed and the above-described engine speed. As above, the idle control stabilizes the combustion by increasing the torque during an idle operation of the internal combustion engine. The idle target speed provides a target value for the engine speed during a period in which the idle control is performed. The idle-requested torque calculation unit 32b calculates an idle-requested torque based on the engine speed and the idle target speed during the period in which the idle control is performed.

The idle-requested torque is synonymous with an idle reserve torque. The idle-requested torque calculated from the monitor module 30 is used to monitor a torque abnormality. The idle reserve torque calculated from the control module 20 is used to calculate a target control amount concerning the internal combustion engine. The idle-requested torque for monitoring and the idle reserve torque for control are arithmetically computed in different sections of the storage area for the memory 11m.

FIG. 3 illustrates the idle target speed and the engine speed as example variables used to calculate the idle-requested torque. The other variables include water temperature, vehicle speed, atmospheric air pressure, and the intake air charging efficiency. The idle-requested torque calculation unit 32b uses at least one of these variables to calculate the idle-requested torque.

When an accelerator pedal is not depressed, for example, a decrease in the difference between the target speed and the engine speed increases a calculation result of the idle-requested torque (reserve amount). When the accelerator pedal is depressed, a decrease in the accelerator opening degree increases a calculation result of the idle-requested torque. The idle-requested torque may be increased or decreased depending on the water temperature, the engine speed, or the charging efficiency.

The operation unit B11 calculates an engine-requested torque required of the internal combustion engine by adding the catalyst warm-up-requested torque, the idle-requested torque, the user-requested torque, and the externally requested torque calculated by the catalyst warm-up-requested torque calculation unit 32a and the idle-requested torque calculation unit 32b. The user-requested torque used for this calculation is calculated by the use of data such as the engine speed and the accelerator opening degree secured by the input securing portion 31.

As above, the engine-requested torque operation unit 32 calculates the engine-requested torque required of the internal combustion engine based on various signals (data) that are acquired from the input processing circuit 11c and the communication circuit 11d and are secured by the input securing portion 31.

As illustrated in FIG. 3, the estimated torque operation unit 33 includes functions as an estimated torque calculation unit 33a, an MBT ignition timing calculation unit 33b, a base ignition timing calculation unit 33c, a torque efficiency calculation unit 33d, a loss torque calculation unit 33e, and operation units B12, B13, and B14.

The estimated torque calculation unit 33a estimates an actual drive torque (MBT estimated torque) of the internal combustion engine at the MBT ignition timing based on the charging efficiency and the engine speed described above. The MBT estimated torque is calculated to be an increasingly large value as the engine speed or the charging efficiency increases. For example, the memory 11m previously stores a map representing correlations among the engine speed, the charging efficiency, and the MBT estimated torque. By referencing the map, the estimated torque calculation unit 33a calculates the MBT estimated torque corresponding to the engine speed and the charging efficiency.

The MBT ignition timing calculation unit 33b calculates the MBT ignition timing based on the charging efficiency and the engine speed. The base ignition timing calculation unit 33c calculates the base ignition timing based on the charging efficiency and the engine speed. The MBT ignition timing and the base ignition timing are calculated by reference to the map previously stored in the memory 11m similarly to the estimated torque calculation unit 33a.

The operation unit B12 subtracts the base ignition timing calculated by the base ignition timing calculation unit 33c from the MBT ignition timing calculated by the MBT ignition timing calculation unit 33b and arithmetically computes the subtracted value as the above-described base retard angle amount. The torque efficiency calculation unit 33d calculates the above-described torque efficiency based on the base retard angle amount arithmetically computed by the operation unit B12. The torque efficiency calculation unit 33d calculates the torque efficiency by assuming the knock learning amount to be a predetermined value or zero.

The loss torque calculation unit 33e calculates a loss torque based on the engine speed and the water temperature. The loss torque represents a value resulting from converting the loss energy including the pumping loss and the friction loss into the torque. For example, the memory 11m previously stores a map representing correlations among the engine speed, the water temperature, and the loss torque. By referencing the map, the loss torque calculation unit 33e calculates the loss torque corresponding to the engine speed and the water temperature.

The operation unit B13 multiplies the MBT estimated torque calculated by the estimated torque calculation unit 33a by the torque efficiency arithmetically computed by the torque efficiency calculation unit 33d and arithmetically computes the multiplied value as an estimated torque exclusive of the loss torque. The operation unit B14 subtracts the loss torque calculated by the loss torque calculation unit 33e from the estimated torque arithmetically computed by the operation unit B13 and arithmetically computes the subtracted value as a monitor estimated torque.

As above, the estimated torque operation unit 33 estimates a drive torque output from the internal combustion engine based on the various signals (data) that are acquired from the input processing circuit 11c and the communication circuit 11d and are secured by the input securing portion 31.

The monitor module 30 always activates a monitor function while the internal combustion engine operates. Specifically, the main process illustrated in FIG. 4 is always performed.

Figure 4:
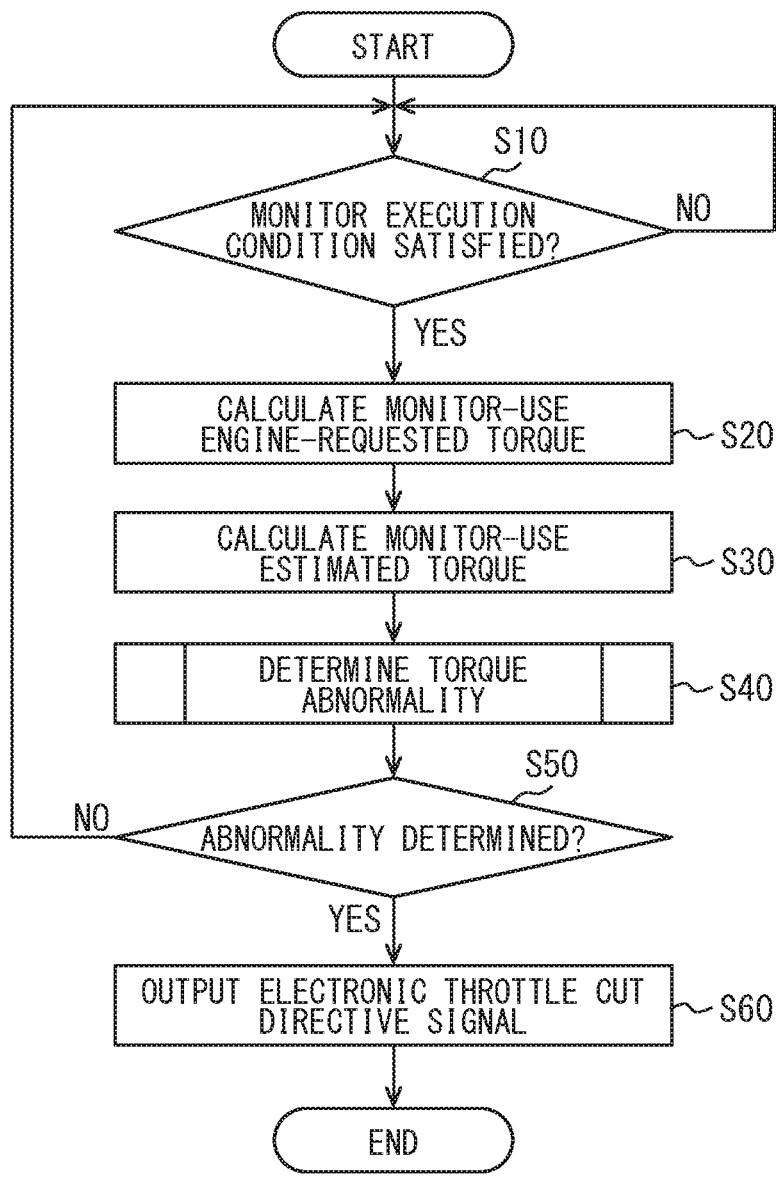
FIG. 4 is a flowchart illustrating a torque monitor control process according to the first embodiment.

In S10, the main process in FIG. 4 determines whether a monitor execution condition is satisfied. Examples of the monitor execution condition include the completion of the check performed by the CPU check circuit 11e and no abnormality detected by the microcomputer monitor unit 16a.

If it is determined that the monitor execution condition is satisfied, then, in S20, the above-described engine-requested torque operation unit 32 calculates an engine-requested torque for monitoring. A block to calculate the user-requested torque is omitted from the engine-requested torque operation unit 32 in FIG. 3. However, the user-requested torque is calculated based on the engine speed and the accelerator opening degree similarly to the user-requested torque calculation unit 21a, for example. The user-requested torque is calculated by the use of data such as the engine speed and the accelerator opening degree secured by the input securing portion 31.

In S30, the above-described estimated torque operation unit 33 calculates an estimated torque for monitoring. In S40 and S50, the above-described torque comparison abnormality determination unit 34 determines whether a torque abnormality occurs. If it is determined in S50 that a torque abnormality occurs, then, in S60, the electronic throttle cut control unit 35 outputs an electronic throttle cut directive signal.

Figure 5:
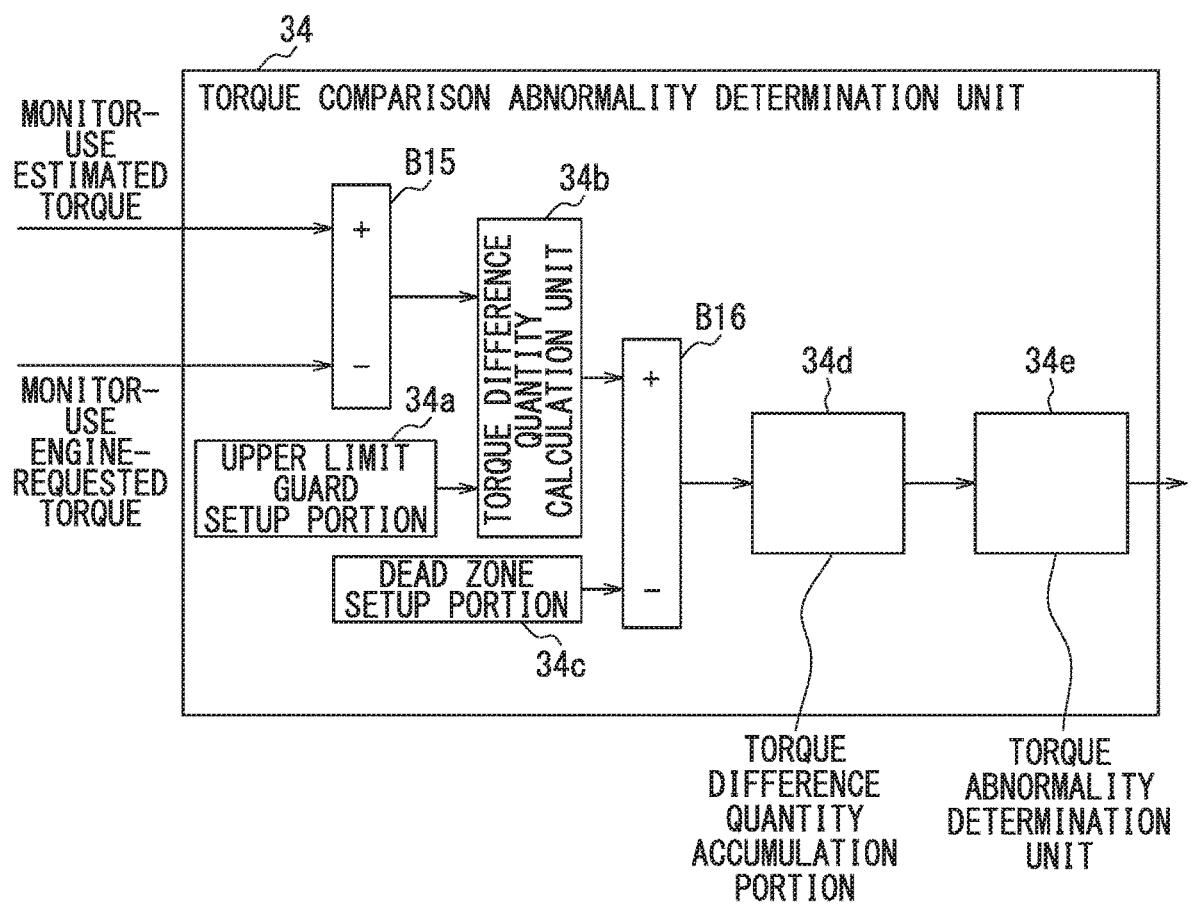
FIG. 5 is a block diagram illustrating details of the torque comparison abnormality determination unit in FIG. 3.

The description below explains in detail the torque abnormality determination process that corresponds to S40 above and is performed by the torque comparison abnormality determination unit 34. As illustrated in FIG. 5, the torque comparison abnormality determination unit 34 includes functions as an upper limit guard setup unit 34a, a torque difference quantity calculation unit 34b, a dead zone setup unit 34c, a torque difference quantity accumulation unit 34d, a torque abnormality determination unit 34e, and operation units B15 and B16.

The operation unit B15 calculates a torque difference quantity by subtracting the estimated torque arithmetically computed by the estimated torque operation unit 33 from an engine-requested torque arithmetically computed by the engine-requested torque operation unit 32. The upper limit guard setup unit 34a settles an upper limit guard value depending on an operation state of the internal combustion engine. For example, the upper limit guard value decreases as the engine speed or an operation load increases.

The torque difference quantity calculation unit 34b compares the torque difference quantity calculated by the operation unit B15 with the upper limit guard value set by the upper limit guard setup unit 34a and settles the smaller one of these as a torque difference quantity. Namely, when the torque difference quantity calculated by the operation unit B15 increases to exceed the upper limit guard value, the torque difference quantity used for the torque abnormality determination is limited to the upper limit guard value.

The dead zone setup unit 34c settles a dead zone based on at least one of an operation state of the vehicle and an operation state of the internal combustion engine. The dead zone ranges from a predetermined lower value (zero) to upper value in the torque difference quantity and assumes the torque difference quantity to be zero. The operation state of the vehicle is mainly exemplified as a gear ratio of the transmission device and traveling speed (vehicle speed) of the vehicle as above. The operation state of the internal combustion engine is mainly exemplified as engine-requested torque, user-requested torque, engine speed, and engine load.

Figure 6:
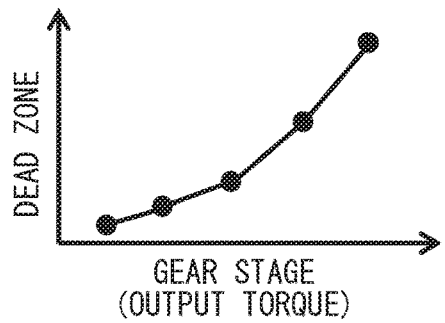
FIG. 6 is a map illustrating the relationship between a dead zone and a gear stage used to set the dead zone in FIG. 5.
Figure 7:
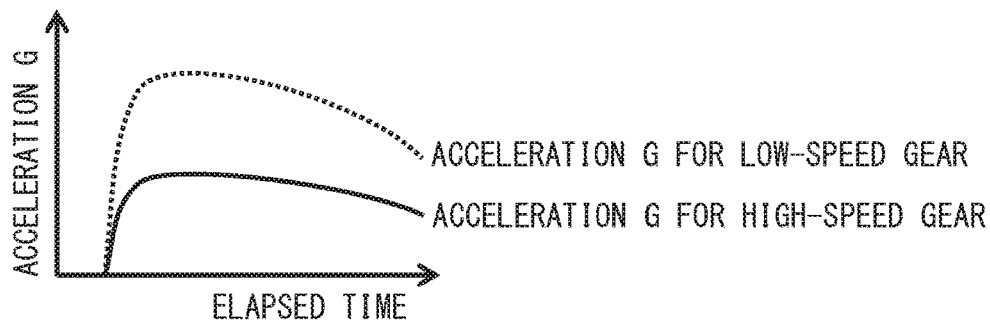
FIG. 7 is a characteristic chart illustrating the relationship between a gear stage and a travel acceleration.

For example, the upper value of the dead zone increases as the transmission device decreases a gear ratio or increases an output torque (see FIG. 6). The transmission device according to the present embodiment includes a plurality of gear stages. A change in the gear stages changes the gear ratio of an output to an input to the transmission device. A change to the low-speed gear stage rotatively drives driving wheels of the vehicle at low revolutions (low speed) and high torque. A change to the high-speed gear stage rotatively drives driving wheels of the vehicle at high revolutions (high speed) and low torque. The change to the high-speed gear stage to provide the high speed and low torque (see a solid line in FIG. 7) increases a traveling acceleration of the vehicle compared to a change to the low-speed gear stage to provide the low speed and high torque (see a dotted line in FIG. 7) when conditions including the amount of accelerator pedal depression are unchanged.

A torque abnormality occurs to give an uncomfortable feeling to a vehicle driver. As the traveling acceleration increases, the uncomfortable feeling is assumed to be little, allowing the abnormal torque state to be hardly determined. Specifically, the upper value of the dead zone increases as the gear stage increases, namely, the gear stage provides the high-speed low torque to increase the traveling acceleration (see FIG. 6).

Figure 8:
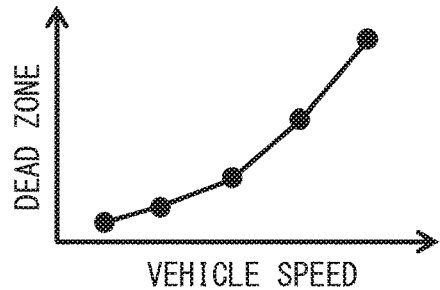
FIG. 8 is a map illustrating the relationship between a dead zone and a vehicle speed used to set the dead zone in FIG. 5.
Figure 9:
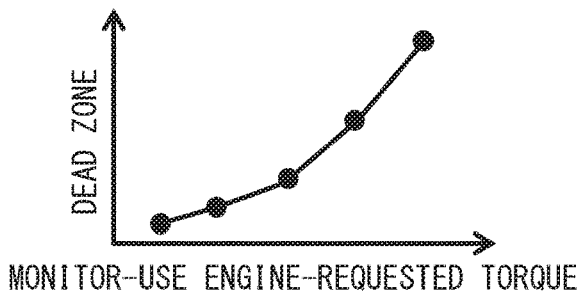
FIG. 9 is a map illustrating the relationship between a dead zone and an engine-requested torque used to set the dead zone in FIG. 5.

As the vehicle speed increases, for example, an uncomfortable feeling given to the vehicle driver due to an occurrence of torque abnormality is assumed to be little, allowing the abnormal torque state to be hardly determined. Specifically, the upper value of the dead zone increases as the vehicle speed increases (see FIG. 8). As the monitor engine-requested torque increases, for example, an uncomfortable feeling given to the vehicle driver due to an occurrence of torque abnormality is assumed to be little, allowing the abnormal torque state to be hardly determined. Specifically, the upper value of the dead zone increases as the monitor engine-requested torque increases (see FIG. 9).

Now referring back to FIG. 5, when the torque difference quantity set by the torque difference quantity calculation unit 34b is smaller than the upper value of the dead zone set by the dead zone setup unit 34c, the operation unit B16 subtracts the upper value of the dead zone from the torque difference quantity. The torque difference quantity accumulation unit 34d (accumulation unit) accumulates torque difference quantities after arithmetically computed by the operation unit B16. The torque abnormality determination unit 34e (determination unit) determines an abnormal torque state when the accumulated value accumulated by the torque difference quantity accumulation unit 34d reaches a predetermined abnormality determination threshold value.

The upper limit guard setup unit 34a, the torque difference quantity calculation unit 34b, the dead zone setup unit 34c, and the operation unit B16 are comparable to a "discrete value setup unit" that increases a discrete value as a difference quantity between the estimated torque and the engine-requested torque increases. The present embodiment uses the torque difference quantity directly as a discrete value. However, the discrete value may be defined as 1 when the torque difference quantity is 10 Nm, for example. The torque difference quantity may be converted into a specified discrete value. Anyway, the discrete value increases as the torque difference quantity increases. The present embodiment subtracts a requested torque from the estimated torque and defines a subtracted value as the difference quantity (discrete value). Therefore, when the estimated torque is smaller than a requested torque, the difference quantity is set as a negative value.

Figure 10:
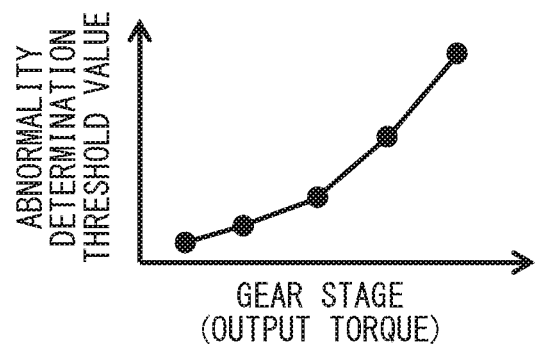
FIG. 10 is a map illustrating the relationship between an abnormality determination threshold value and a gear stage used to set the abnormality determination threshold value in FIG. 5.
Figure 11:
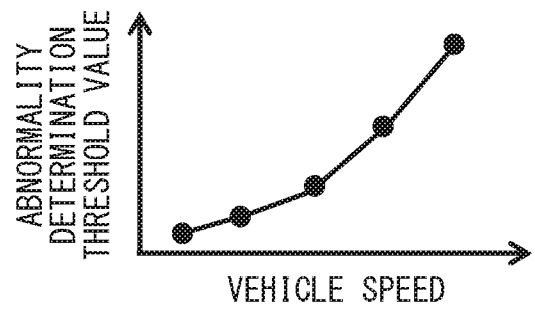
FIG. 11 is a map illustrating the relationship between an abnormality determination threshold value and a vehicle speed used to set the abnormality determination threshold value in FIG. 5.

The torque abnormality determination unit 34e variably settles the abnormality determination threshold value corresponding to at least one of an operation state of the vehicle and an operation state of the internal combustion engine. The operation state of the vehicle is mainly exemplified as the gear ratio of the transmission device and traveling speed (vehicle speed) of the vehicle as above. The operation state of the internal combustion engine is mainly exemplified as engine-requested torque, user-requested torque, engine speed, and engine load. As the gear ratio decreases or the transmission device increases an output torque, for example, an uncomfortable feeling given to the vehicle driver due to an occurrence of torque abnormality is assumed to be little. The abnormality determination threshold value is increased and allows the abnormal torque state to be hardly determined (see FIG. 10). Alternatively, as the vehicle speed increases, an uncomfortable feeling given to the vehicle driver due to an occurrence of torque abnormality is assumed to be little. The abnormality determination threshold value is increased and allows the abnormal torque state to be hardly determined (see FIG. 11).

Figure 12:
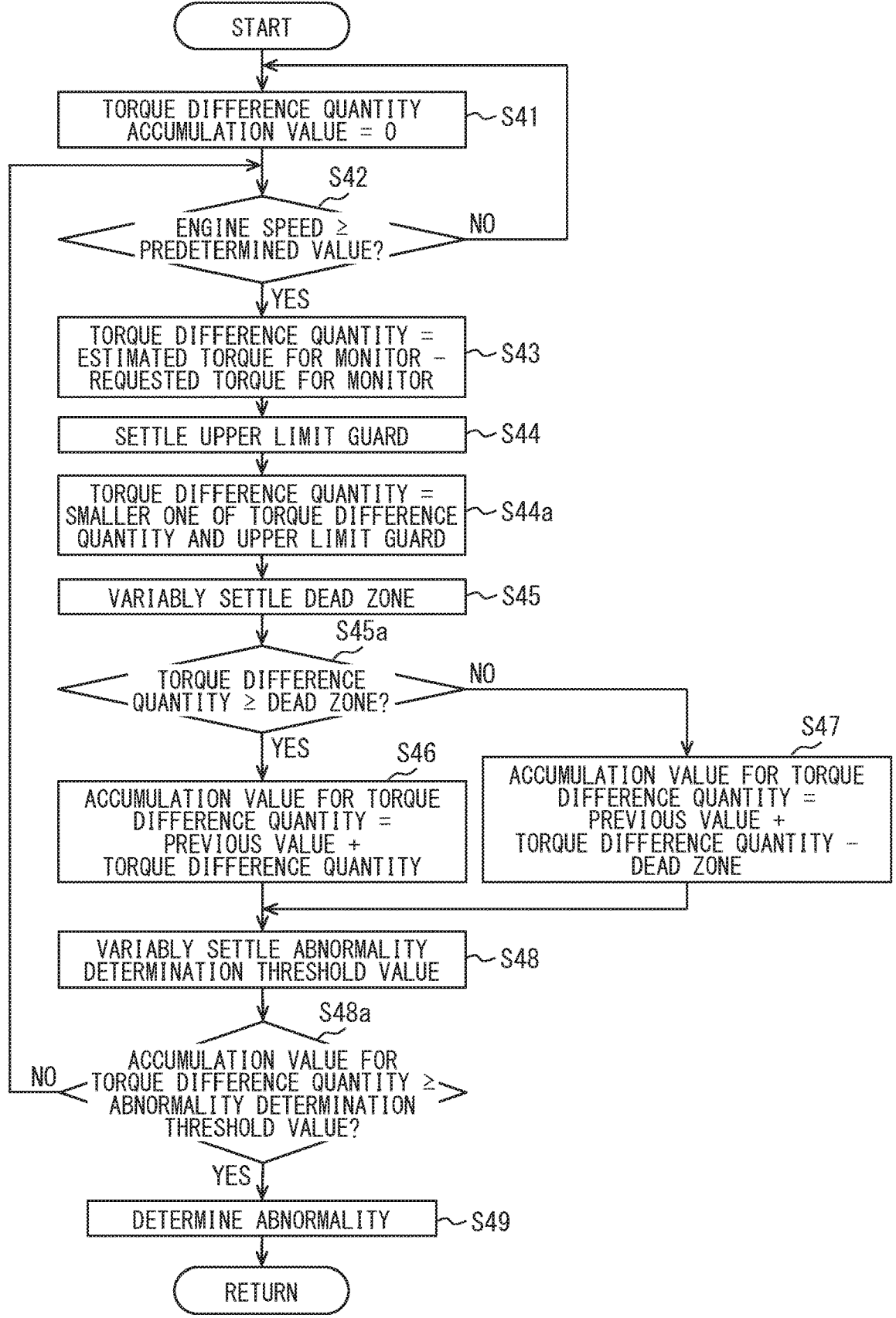
FIG. 12 is a flowchart illustrating the torque abnormality determination process illustrated in FIG. 4.

FIG. 12 is a flowchart illustrating the subroutine process corresponding to S40 in FIG. 40. In S41, the process resets a torque difference quantity accumulation value to zero. In S42, the process determines whether the engine speed is higher than or equal to a predetermined value. The predetermined value is set to be smaller than idle speed and larger than cranking speed caused by a starting motor to start the internal combustion engine. If the engine speed is lower than the predetermined value, the process assumes the detection value, namely, the intake air amount detected by an airflow meter, to be unstable. The process inhibits subsequent execution of the abnormality determination process and returns to S41.

If the engine speed is higher than or equal to the predetermined value, then, in S43, the operation unit B15 subtracts the estimated torque arithmetically computed by the estimated torque operation unit 33 from the engine-requested torque arithmetically computed by the engine-requested torque operation unit 32 to calculate a torque difference quantity. In S44, the upper limit guard setup unit 34a variably settles an upper limit guard value based on the operation state of the internal combustion engine. In S44a, the torque difference quantity calculation unit 34b limits the torque difference quantity to the upper limit guard value.

In S45, the dead zone setup unit 34c variably settles a range of the dead zone corresponding to at least one of the operation state of the vehicle and the operation state of the internal combustion engine. In S45a, the process determines whether the torque difference quantity set in S44a falls within the range of the dead zone set in S45. Specifically, the process determines whether the torque difference quantity is larger than or equal to the upper value of the dead zone.

If it is determined that the torque difference quantity falls within the range of the dead zone, then, in S46, the process adds the torque difference quantity set in S44a to the previous value of the accumulation value for the torque difference quantity. If it is determined that the torque difference quantity falls outside the range of the dead zone, then, in S47, the process adds the torque difference quantity set in S44a to the previous value of the accumulation value for the torque difference quantity and subtracts the upper value of the dead zone from the added value. The operation unit B16 and the torque difference quantity accumulation unit 34d perform the process variably in S45a, S46, and S47.

In S48, the process variably settles the abnormality determination threshold value corresponding to at least one of the operation state of the vehicle and the operation state of the internal combustion engine as already described concerning the torque abnormality determination unit 34e. In S48a, the process determines whether the torque difference quantity accumulation value calculated in S46 or S47 is larger than or equal to the determination threshold value set in S48. If it is determined that the accumulation value is smaller than the determination threshold value, the process returns to S42. If it is determined that the accumulation value is larger than or equal to the determination threshold value, then, in S49, the process determines that the torque abnormality determination unit 34e enters the abnormal torque state. The process turns on a torque abnormality flag. Then, in S50 of FIG. 4, the process determines an abnormality, outputs an electronic throttle cut directive signal, and limits operations of the electronic throttle valve.

Figure 13:
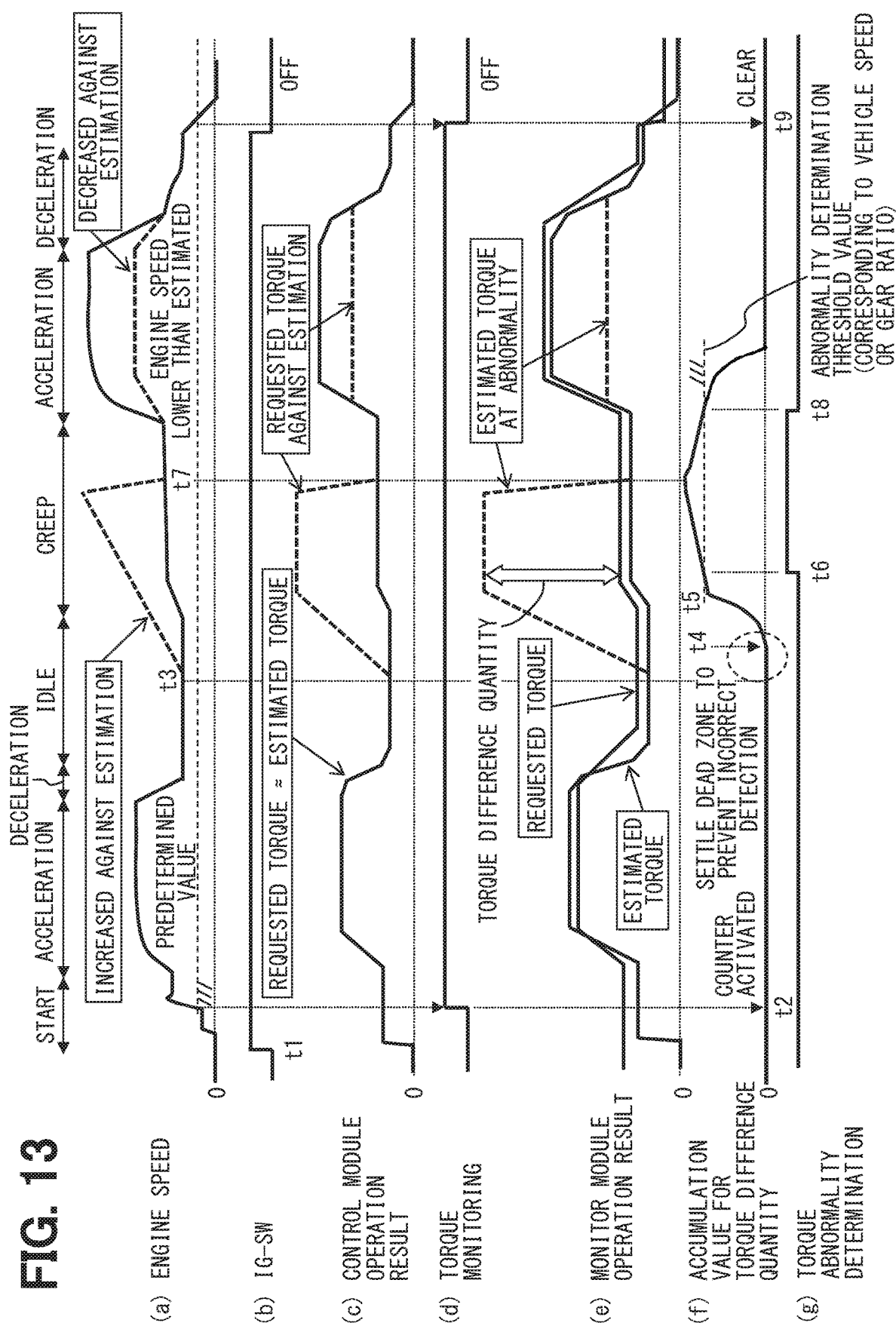
FIG. 13 is a time chart illustrating the transition of arithmetic computation results from the control module and the monitor module corresponding to the transition of operation states of the internal combustion engine according to the first embodiment.

Items (a) to (g) in FIG. 13 illustrate changes in engine speed, ignition switch, operation result of the control module 20, torque monitoring flag, operation result of the monitor module 30, accumulation value for the torque difference quantity, and torque abnormality determination flag based on the elapsed time. According to the example in FIG. 13, item (b) illustrates that the ignition switch is turned on at time point t1. The starting motor for the internal combustion engine is driven to start the engine. Then, the operation state transitions in the order of acceleration travel, deceleration travel, idling, creep, acceleration travel, and deceleration travel.

Item (a) illustrates that the engine starts to increase the engine speed up to a predetermined value at time point t2. At time point t2, the torque monitoring flag in item (d) turns on to monitor the torque and start the accumulation using a counter. The counter signifies the torque difference quantity accumulation unit 34d that accumulates discrete values for the torque difference quantity. At time point t2, the determination in S42 of FIG. 12 is affirmed to permit the accumulation of torque difference quantity accumulation values in item (f).

Item (c) illustrates that the engine-requested torque arithmetically computed by the control module 20 is equal to the estimated torque during the period from time point t2 to time point t3. Similarly, item (d) illustrates that the engine-requested torque arithmetically computed by the monitor module 30 is approximately equal to the estimated torque during the period from time point t2 to time point t3.

At time point t3 for the idling, however, an abnormality occurs on data stored in the control storage area 20m. The control engine-requested torque increases against the estimation due to the abnormality occurrence. Then, the drive signal output unit 22 of the control module 20 controls various drive ICs 12, 13, and 14 to increase the engine output torque. As a result, the control estimated torque estimated by the control module 20 and the actual torque increase as the control engine-requested torque increases. The control estimated torque provides a feedback value used for feedback control over the drive ICs 12, 13, and 14.

Meanwhile, the monitor module 30 arithmetically computes a requested torque (monitor requested torque) by using data in the monitor storage area 30m apart from the control storage area 20m where the abnormality occurs. Therefore, the monitor requested torque does not increase even if the control requested torque increases due to the occurrence of data abnormality in the control storage area 20m. However, increase in the actual torque causes the monitor estimated torque to increase as represented by a broken line in item (e). This increases the torque difference quantity as a difference between the monitor requested torque and the monitor estimated torque.

As the torque difference quantity increases, the accumulation value in item (f) also increases. However, the torque difference quantity is smaller than the dead zone during the period from time point t3 of the abnormality occurrence to time point t4. Therefore, the accumulation value remains zero. At time point t5, the torque difference quantity increases up to the upper limit guard. The accumulation value accordingly increases at a decreased speed at time point t5 and later.

At time point t6, the accumulation value increases up to the abnormality determination threshold value and a flag for the torque abnormality determination turns on as illustrated in item (g). This allows the electronic throttle cut control unit 35 to limit the engine output, decreases the actual torque and the engine speed, and decreases also the control estimated torque and the monitor estimated torque. When the monitor estimated torque decreases sufficiently, the torque difference quantity becomes smaller than the upper value of the dead zone. As a result, the accumulation value decreases in S47 of FIG. 12. Namely, the accumulation value starts decreasing at time point t7 in item (f). At time point t8, the accumulation value becomes smaller than the abnormality determination threshold value and the flag for the torque abnormality determination turns off as illustrated in item (g).

An abnormality subsequently occurs on data stored in the control storage area 20m during the acceleration travel. The abnormality occurrence causes the control engine-requested torque to decrease against the estimation. Then, the drive signal output unit 22 of the control module 20 controls the various drive ICs 12, 13, and 14 to decrease the engine output torque. As a result, the control estimated torque and the actual torque decrease as the control engine-requested torque increases. In this case, the monitor estimated torque also decreases but the torque difference quantity provides a negative value. The torque difference quantity accumulation value remains zero.

When the ignition switch is subsequently turned off, the engine speed decreases to be lower than the predetermined value at time point t9. At this time point, the torque monitoring flag is turned off to terminate the torque monitor. The accumulation value is cleared to zero.

According to the present embodiment, the ECU 10 (torque monitoring device) includes a discrete value setup unit, an accumulation unit, and a determination unit. The discrete value setup unit increases the torque difference quantity as a discrete value correspondingly to increase in the difference quantity between the monitor estimated torque and the monitor engine-requested torque. The accumulation unit calculates an accumulation value for torque difference quantities. The determination unit determines that the abnormal torque state occurs when the accumulation value becomes larger than or equal to the abnormality determination threshold value. Increase in the difference quantity readily determines the abnormal torque state. A torque abnormality can be detected fast. A decrease in the difference quantity hardly determines the abnormal torque state. It is possible to decrease the possibility of incorrectly determining a torque abnormality due to a cause such as noise.

Figure 14:
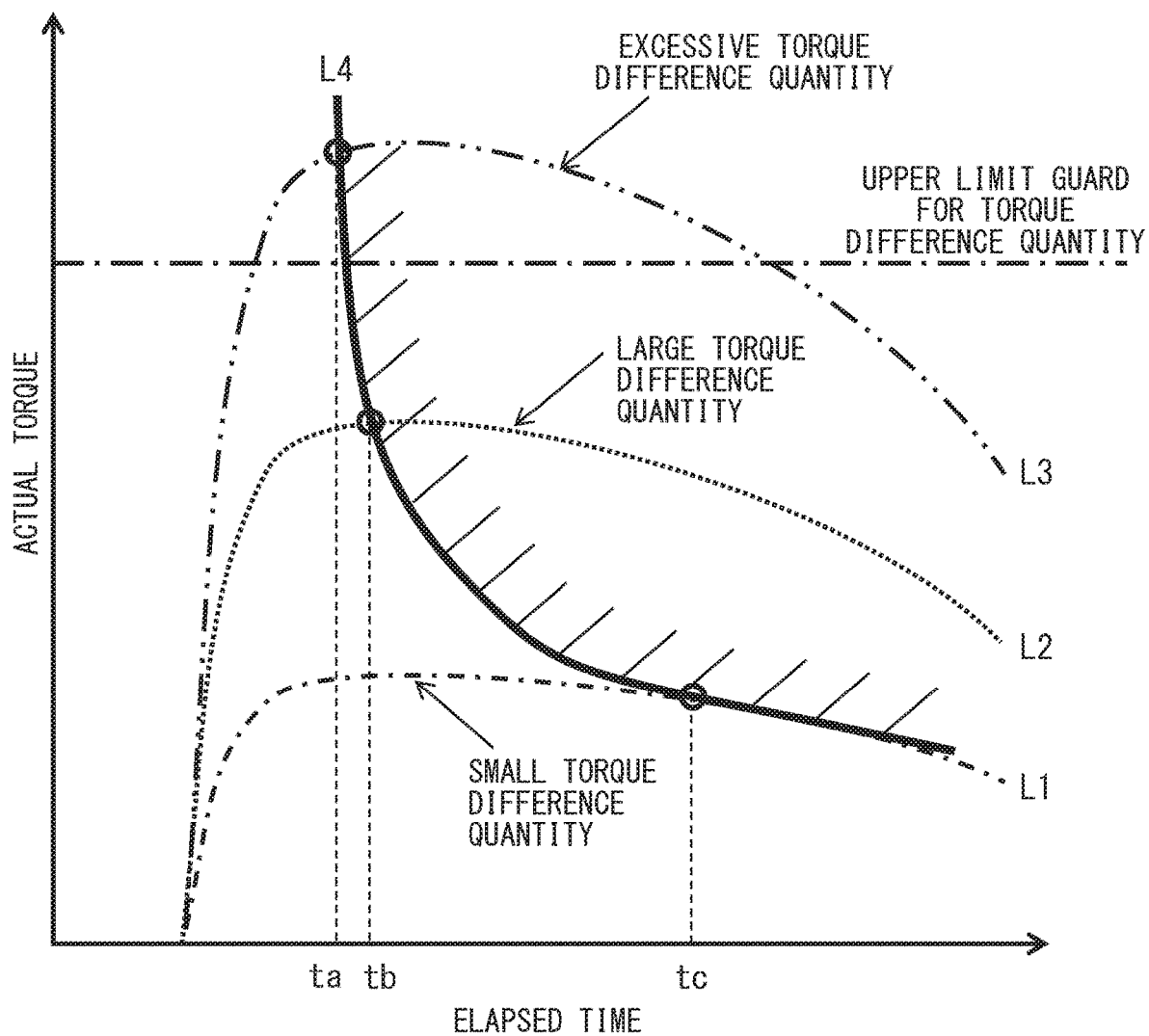
FIG. 14 is a time chart illustrating operation and effect according to the first embodiment.

FIG. 14 illustrates a mode of fast detecting the torque abnormality as above. The horizontal axis in FIG. 14 represents the elapsed time. The vertical axis represents how actual output (actual torque) from the internal combustion engine increases against the estimation. Dash-dot-dash line L1 in the drawing represents an example where the abnormality causes a small increase in the actual torque and generates a small torque difference quantity. In this case, the accumulation value increases up to the abnormality determination threshold value at time point tc and an abnormality is determined.

Dotted line L2 in the drawing represents an example where the abnormality causes a large increase in the actual torque and generates a large torque difference quantity. In this case, the torque difference quantity is large and, therefore, the discrete value is set to be large. The accumulation value increases up to the abnormality determination threshold value at time point tb earlier than time point tc and an abnormality is determined.

Dash-dot-dot-dash line L3 in the drawing represents an example where the abnormality causes a much larger increase in the actual torque and allows the torque difference quantity to be larger than the upper limit guard value. In this case, the discrete value is limited to the upper limit guard value. However, the accumulation value increases up to the abnormality determination threshold value at time point ta earlier than time point tb and an abnormality is determined.

Solid line L4 in the drawing represents a request value that requires promptness of the abnormality determination. As solid line L4 represents, an abnormality needs to be determined in as short a time as possible correspondingly to increase in the ascent rate of the actual torque. However, the upper limit guard value restricts the size of the discrete value. No abnormality is determined in the time shorter than a predetermined time.

According to the present embodiment, the discrete value setup unit settles the discrete value such that the discrete value does not exceed the predetermined upper limit guard value. The purpose is to avoid the abnormality determination because of the accumulation value that momentarily exceeds the abnormality determination value when the torque difference quantity momentarily exceeds the upper limit guard value due to a cause such as noise. It is possible to inhibit the torque abnormality determination in such a case where the torque difference quantity momentarily exceeds the upper limit guard value and the electronic throttle cut is unnecessary. In other words, it is possible to inhibit incorrect determination on a torque abnormality.

A decrease in the upper limit guard value can promote the inhibition of incorrect determination on a torque abnormality. However, an adverse effect is to impair the promptness of torque abnormality detection. An optimal balance between the inhibition of incorrect determination and the promptness depends on operation states of the internal combustion engine. Considering this point, the present embodiment variably settles the upper limit guard value depending on operation states of the internal combustion engine. The above-described balance can be optimized. For example, the upper limit guard value is decreased on the assumption that the vehicle driver can decrease an uncomfortable feeling due to an occurrence of torque abnormality as the engine speed or an operation load increases. The inhibition of incorrect determination is promoted in preference to the promptness of torque abnormality detection.

According to the present embodiment, the accumulation unit limits the accumulation of discrete values when the torque difference quantity falls within the predetermined dead zone. When the torque difference quantity is smaller than the upper value of the dead zone, the accumulation unit adds discrete values corresponding to the torque difference quantity to the accumulation value and subtracts discrete values corresponding to the upper value from the accumulation value. The purpose is to avoid the abnormality determination because of the accumulation value that exceeds the abnormality determination value when a small value within the range of the dead zone forces the torque difference quantity to continue for a long time due to a cause such as noise. It is possible to inhibit the torque abnormality determination in such a case where a small torque difference quantity continues for a long time and the electronic throttle cut is unnecessary. In other words, it is possible to inhibit incorrect determination on a torque abnormality.

An increase in the upper value of the dead zone can promote the inhibition of incorrect determination on a torque abnormality. However, an adverse effect is to impair the promptness of torque abnormality detection. An optimal balance between the inhibition of incorrect determination and the promptness depends on an operation state of the internal combustion engine and an operation state of the vehicle. Considering this point, the present embodiment variably settles the dead zone depending on operation states of the vehicle or the internal combustion engine. The above-described balance can be optimized. For example, the dead zone is expanded on the assumption that the vehicle driver can decrease an uncomfortable feeling due to an occurrence of torque abnormality as the gear ratio decreases or the vehicle travel speed increases. The inhibition of incorrect determination is promoted in preference to the promptness of torque abnormality detection.

An increase in the abnormality determination threshold value can promote the inhibition of incorrect determination on a torque abnormality. However, an adverse effect is to impair the promptness of torque abnormality detection. An optimal balance between the inhibition of incorrect determination and the promptness depends on an operation state of the vehicle or an operation state of the internal combustion engine. Considering this point, the present embodiment variably settles the abnormality determination threshold value depending on operation states of the vehicle or the internal combustion engine. The above-described balance can be optimized. For example, the abnormality determination threshold value is increased on the assumption that the vehicle driver can decrease an uncomfortable feeling due to an occurrence of torque abnormality as the gear ratio decreases or the vehicle travel speed increases. The inhibition of incorrect determination is promoted in preference to the promptness of torque abnormality detection.

The ECU 10 (torque monitoring device) according to the present embodiment includes the control module 20 (control arithmetic device) and the monitor module 30 (monitor arithmetic device). The control module 20 is provided as an arithmetic device that performs an arithmetic computation by using the control storage area 20m. The control module 20 arithmetically computes a target control amount as a target value for the control amount to control combustion states of the internal combustion engine based on the user-requested torque. The monitor module 30 is provided as an arithmetic device that performs an arithmetic computation by using the monitor storage area 30m different from the control storage area 20m. The monitor module 30 includes a discrete value setup unit, an accumulation unit, and a determination unit. The monitor module 30 is provided as an arithmetic device to monitor the torque and performs an arithmetic computation by using the monitor storage area 30m different from the control storage area 20m. As illustrated in FIG. 13, the monitor estimated torque becomes an abnormal value but the monitor requested torque does not become an abnormal value. Therefore, a torque difference increases. It is possible to monitor a torque abnormality due to an abnormality of data stored in the control storage area 20*m*.

The operation speed and accuracy are lowered for an estimated torque and a requested torque used for the monitor compared to an estimated torque and a requested torque used for the control. Considering this point, the present embodiment allows an operation cycle of the monitor module 30 to be longer than an operation cycle of the control module 20. It is possible to avoid increasing an arithmetic processing load on the monitor module 30 more than necessary.

The request to secure the normality of data used for the torque operation is increased for an estimated torque and a requested torque used for the monitor compared to an estimated torque and a requested torque used for the control. Considering this point, the present embodiment provides the monitor module 30 with the input securing portion 31 that checks the normality of data acquired from outside the monitor module 30. It is possible to improve the reliability of securing the normality of data used for arithmetical operations on the monitor module 30 and respond to the above-described request.

According to the present embodiment, the monitor module 30 includes the engine-requested torque operation unit 32 and the estimated torque operation unit 33. The engine-requested torque operation unit 32 calculates a reserve torque, namely, a decrease in the actual torque resulting from the ignition timing retard for the internal combustion engine, and arithmetically computes an engine-requested torque based on the calculated reserve torque and the user-requested torque. It is possible to inhibit a difference between the engine-requested torque and the estimated torque resulting from arithmetically computing the engine-requested torque by taking no account of the reserve torque. Therefore, it is possible to inhibit the possibility of incorrectly determining a torque abnormality.

The present embodiment configures the control module 20 such that the target ignition moment retards when the catalyst warm-up is requested. The engine-requested torque operation unit 32 calculates the reserve torque to be larger than or equal to a torque that is comparable to the retard angle amount requested by the catalyst warm-up and degrades the combustion efficiency.

The present embodiment configures the control module 20 such that the target ignition moment retards during idle operation. The engine-requested torque operation unit 32 calculates the reserve torque to be larger than or equal to a torque that is comparable to the retard angle amount of the idle-requested torque and degrades the combustion efficiency. The monitor engine-requested torque reflects the degraded combustion efficiency such as a catalyst warm-up request or an idle request resulting from the ignition timing retard. Therefore, it is possible to inhibit the possibility of the above-described incorrect determination.

Other Embodiments

The disclosure of this specification is not limited to the described embodiments. The disclosure includes the described embodiments and modified forms provided by those skilled in the art based on the embodiments. For example, the disclosure is not limited to combinations of the parts and/or elements described in the embodiments. The disclosure is available in various combinations. The disclosure can include an additional part that can be added to the embodiments. The disclosure includes an embodiment that is devoid of the parts and/or elements of the embodiments. The disclosure includes a replacement or a combination of the parts and/or elements between one embodiment and the other embodiment. The disclosed technical scope is not limited to the description of the embodiments. Some of the disclosed technical scopes need to be understood to be available in the description of the claims and to include all changes in the meaning and the scope comparable to the description of the claims.

When the torque difference quantity is smaller than the upper value of the dead zone, the first embodiment adds discrete values corresponding to the torque difference quantity to the accumulation value and subtracts discrete values corresponding to the upper value from the accumulation value. Therefore, the accumulation value decreases. Alternatively, when the torque difference quantity is smaller than the upper value of the dead zone, it may also be favorable to avoid the addition of discrete values to the accumulation value, prevent only discrete values corresponding to the upper value from being subtracted from the accumulation value, and restrain the accumulation value from decreasing.

The first embodiment limits the accumulation of discrete values depending on whether the torque difference quantity falls within the dead zone range. Meanwhile, it may also be favorable to limit the accumulation of discrete values depending on whether a discrete value corresponding to the torque difference quantity falls within the dead zone range.

The first embodiment variably settles the upper limit guard value depending on operation states of the internal combustion engine. However, the upper limit guard value may be set as a predetermined fixed value regardless of the operation states. The first embodiment variably settles the dead zone depending on operation states of the vehicle or the internal combustion engine. However, the dead zone may be set as a predetermined fixed value regardless of the operation states. Similarly, the abnormality determination threshold value may also be set as a predetermined fixed value instead of the variable settlement.

In S42 of FIG. 12, the first embodiment performs the torque abnormality determination process in S43 and later on condition that the engine speed is higher than or equal to a predetermined value. Meanwhile, it may also be favorable to perform the torque abnormality determination process in S43 and later on condition that the amount of change in the engine speed is smaller than a predetermined criterion.

According to the first embodiment, the monitor module 30 includes the discrete value setup unit, the accumulation unit, and the determination unit. The monitor module 30 settles a discrete value, calculates an accumulation value, and determines an abnormality. Meanwhile, the control module 20 may include the discrete value setup unit, the accumulation unit, and the determination unit. The control module 20 may set a discrete value, calculate an accumulation value, and determine an abnormality. Both the control module 20 and the monitor module 30 may perform these processes.

According to the embodiments, the operation speed of the monitor module 30 is lower than the operation speed of the control module 20. Specifically, the bottleneck is a check processing speed of the input securing portion 31. The operation speeds of the engine-requested torque operation unit 32 and the estimated torque operation unit 33 are lower than the operation speed of the engine-requested torque calculation unit 21. Instead, the operation speed of the monitor module may be comparable to the operation speed of the control module 20.

According to the embodiments, the storage area of one shared memory 11*m* includes the control storage area 20*m* and the monitor storage area 30*m*. Instead, the ECU 10 may include a plurality of memories. A storage area of the first memory may be defined as the control storage area and a storage area of the second memory may be defined as the monitor storage area.

According to the embodiments, one shared MCU 11 includes the control storage area 20*m* and the monitor storage area 30*m*. Instead, the ECU 10 may include a plurality of MCUs. The first MCU may include the control storage area and the second MCU may include the monitor storage area.

According to the embodiments, the internal combustion engine mounted on a vehicle is assumed to be a control target of the ECU 10. Instead, the control target of the ECU 10 may include a stationary engine, not vehicle-mounted. The monitor target may include a vehicle-driving motor mounted on a hybrid vehicle or an electric vehicle. In this case, the discrete value is increased correspondingly to increase in the difference quantity between a torque requested of the vehicle-driving motor and the actual torque.

The invention claimed is:

1. A torque monitoring device configured to monitor occurrence of an abnormal torque state in which an estimated torque, which is an estimated value for an actual torque of an internal combustion engine, differs from an engine-requested torque required of the internal combustion engine, the torque monitoring device comprising:
a processor configured to:
increase a discrete value correspondingly to an increase in a difference quantity between the estimated torque and the engine-requested torque;
implement accumulation of the discrete value to calculate an accumulation value;
determine that the abnormal torque state occurs when the accumulation value becomes larger than or equal to a predetermined abnormality determination threshold value, and
set the discrete value such that the discrete value does not exceed a predetermined upper limit guard value;
wherein the upper limit guard value as an engine speed or an operation load increases.

2. The torque monitoring device according to claim 1, wherein
the upper limit guard value is variably set depending on an operation state of the internal combustion engine.

3. The torque monitoring device according to claim 1, wherein
the processor is configured to limit the accumulation of the discrete value when the difference quantity falls within a predetermined dead zone.

4. The torque monitoring device according to claim 1, wherein
the abnormality determination threshold value is variably set depending on one of an operation state of a vehicle traveling by using the internal combustion engine as a drive source and an operation state of the internal combustion engine.

5. The torque monitoring device according to claim 1, wherein the processor is further configured to:
perform an arithmetic computation by using a control storage area and to arithmetically compute a target control amount as a target value for a control amount to control combustion states of the internal combustion engine based on a user-requested torque of the internal combustion engine requested by a user; and
perform an arithmetic computation by using a monitor storage area different from the control storage area.

6. The torque monitoring device according to claim 5, wherein
an operation cycle of the monitor arithmetic device is longer than an operation cycle of the control arithmetic device.

7. The torque monitoring device according to claim 5, wherein
the monitor arithmetic device includes an input securing portion configured to check whether normal data is acquired from outside the monitor arithmetic device.

8. A torque monitoring device configured to monitor occurrence of an abnormal torque state in which an estimated torque, which is an estimated value for an actual torque of an internal combustion engine, differs from an engine-requested torque required of the internal combustion engine, the torque monitoring device comprising:
a processor configured to:
increase a discrete value correspondingly to an increase in a difference quantity between the estimated torque and the engine-requested torque;
implement accumulation of the discrete value to calculate an accumulation value; and
determine that the abnormal torque state occurs when the accumulation value becomes larger than or equal to a predetermined abnormality determination threshold value, wherein
wherein the difference quantity does not fall within a predetermined dead zone, the accumulation value is calculated, as a first accumulation value, such that the discrete value is accumulated;
when the difference quantity falls within the predetermined dead zone, the accumulation value is calculated, as a second accumulation value, such that the discrete value is accumulated and an upper value of the predetermined dead zone is subtracted; and
the dead zone is variably set depending on one of an operation state of a vehicle traveling by using the internal combustion engine as a drive source and an operation state of the internal combustion engine.

9. The torque monitoring device according to claim 8, wherein
the vehicle includes a transmission device having gears configured to convert rotation speed of an output shaft of the internal combustion engine into requested rotation speed for output; and
the dead zone expands correspondingly to increase in one of a gear ratio of output to input in the transmission device and travel speed of the vehicle.

10. A torque monitoring device configured to monitor occurrence of an abnormal torque state in which an estimated torque, which is an estimated value for an actual torque of an internal combustion engine, differs from an engine-requested torque required of the internal combustion engine, the torque monitoring device comprising:
a processor configured to:
increase a discrete value correspondingly to an increase in a difference quantity between the estimated torque and the engine-requested torque;
implement accumulation of the discrete value to calculate an accumulation value; and
determine that the abnormal torque state occurs when the accumulation value becomes larger than or equal to a predetermined abnormality determination threshold value, wherein the abnormality determination threshold value is variably set depending on one of an operation state of a vehicle traveling by using the internal combustion engine as a drive source and an operation state of the internal combustion engine; and the abnormality determination threshold value increases as a vehicle speed increases.

11. The torque monitoring device according to claim 10, wherein the vehicle includes a transmission device having gears configured to convert rotation speed of an output shaft of the internal combustion engine into requested rotation speed for output, and the abnormality determination threshold value increases correspondingly to one of a decrease in a gear ratio of output to input in the transmission device and increase in travel speed of the vehicle.

12. The torque monitoring device according to claim 10, wherein the abnormality determination threshold value increases as a transmission device having gears increases an output torque.

* * * * *